April 21, 1942.　　　　O. H. TRACY　　　　2,280,324
PIE MAKING MACHINE
Filed Oct. 14, 1940　　　　5 Sheets-Sheet 1

INVENTOR
Oliver H. Tracy
BY
ATTORNEY

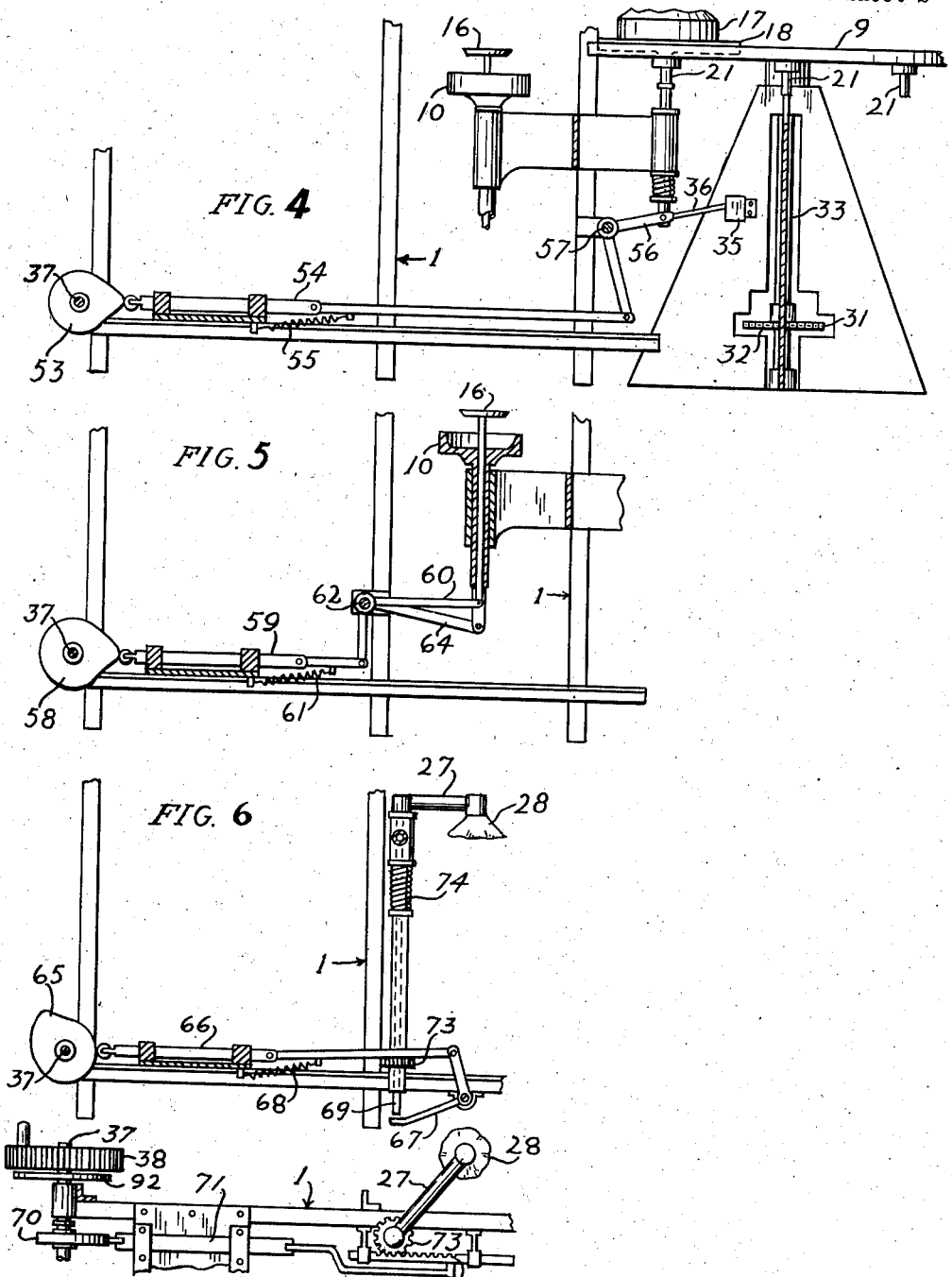

April 21, 1942.  O. H. TRACY  2,280,324
PIE MAKING MACHINE
Filed Oct. 14, 1940  5 Sheets-Sheet 3
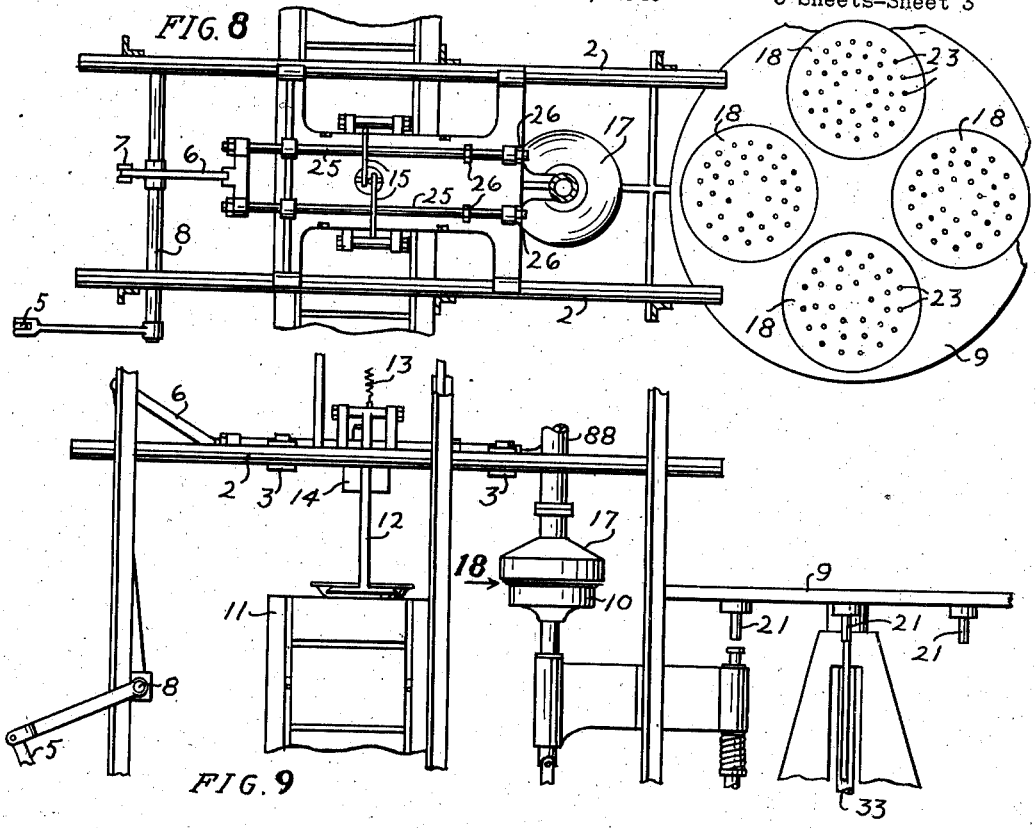
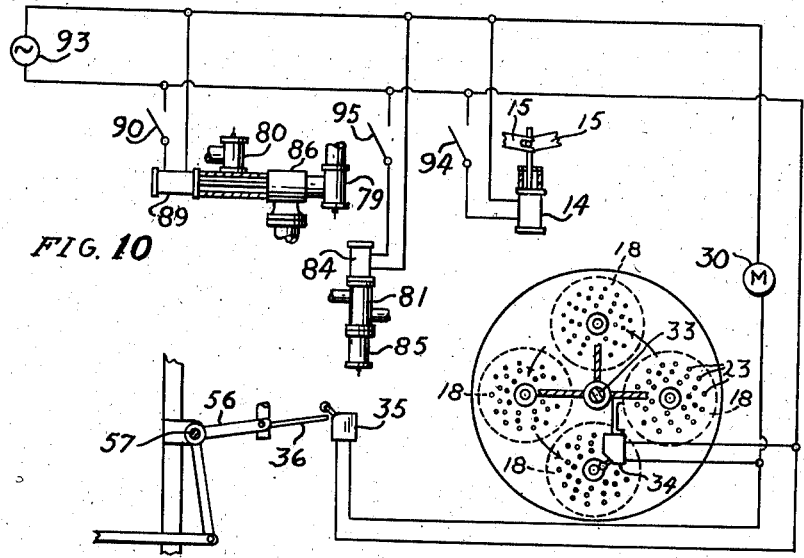
INVENTOR
Oliver H. Tracy
BY
ATTORNEY

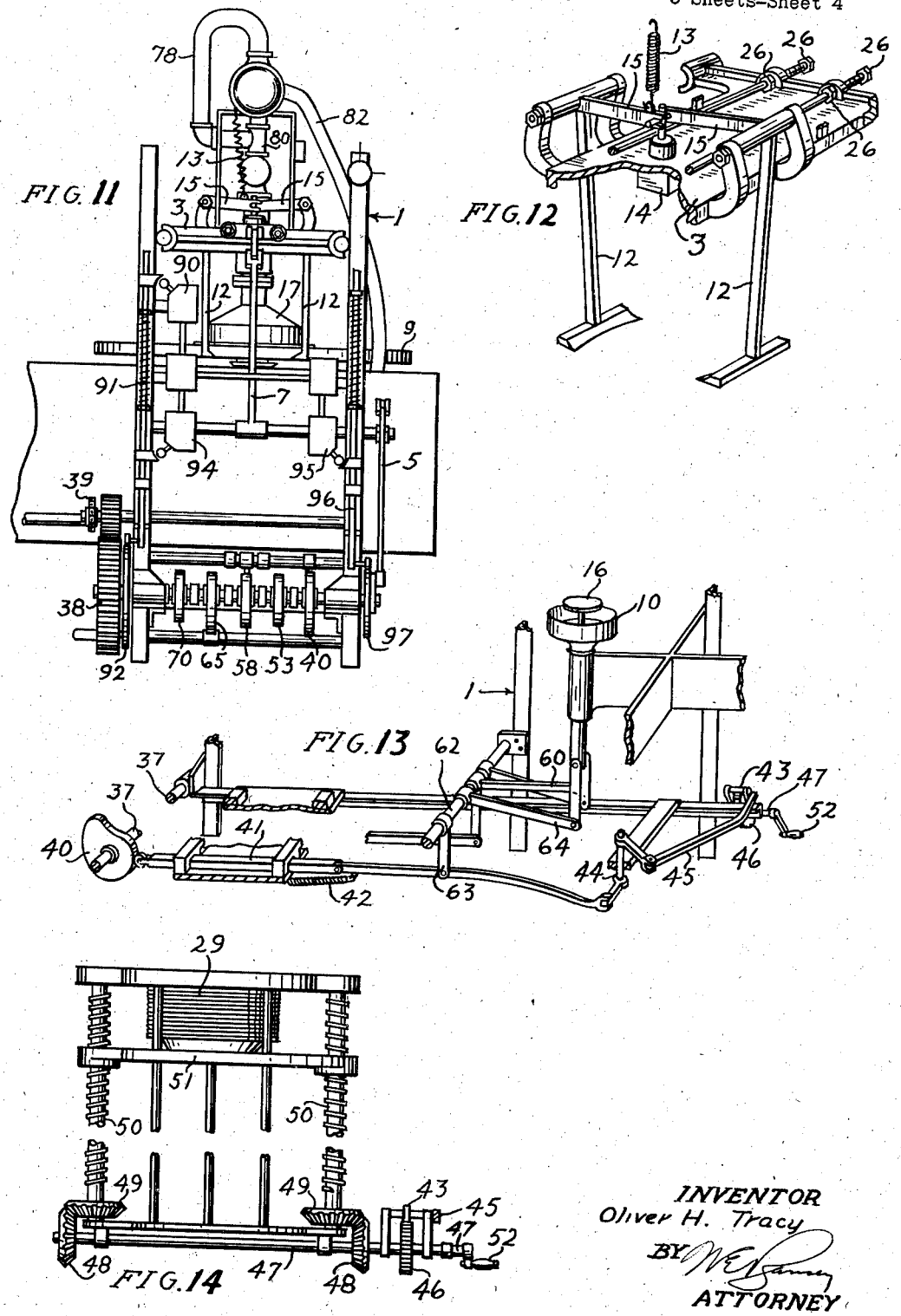

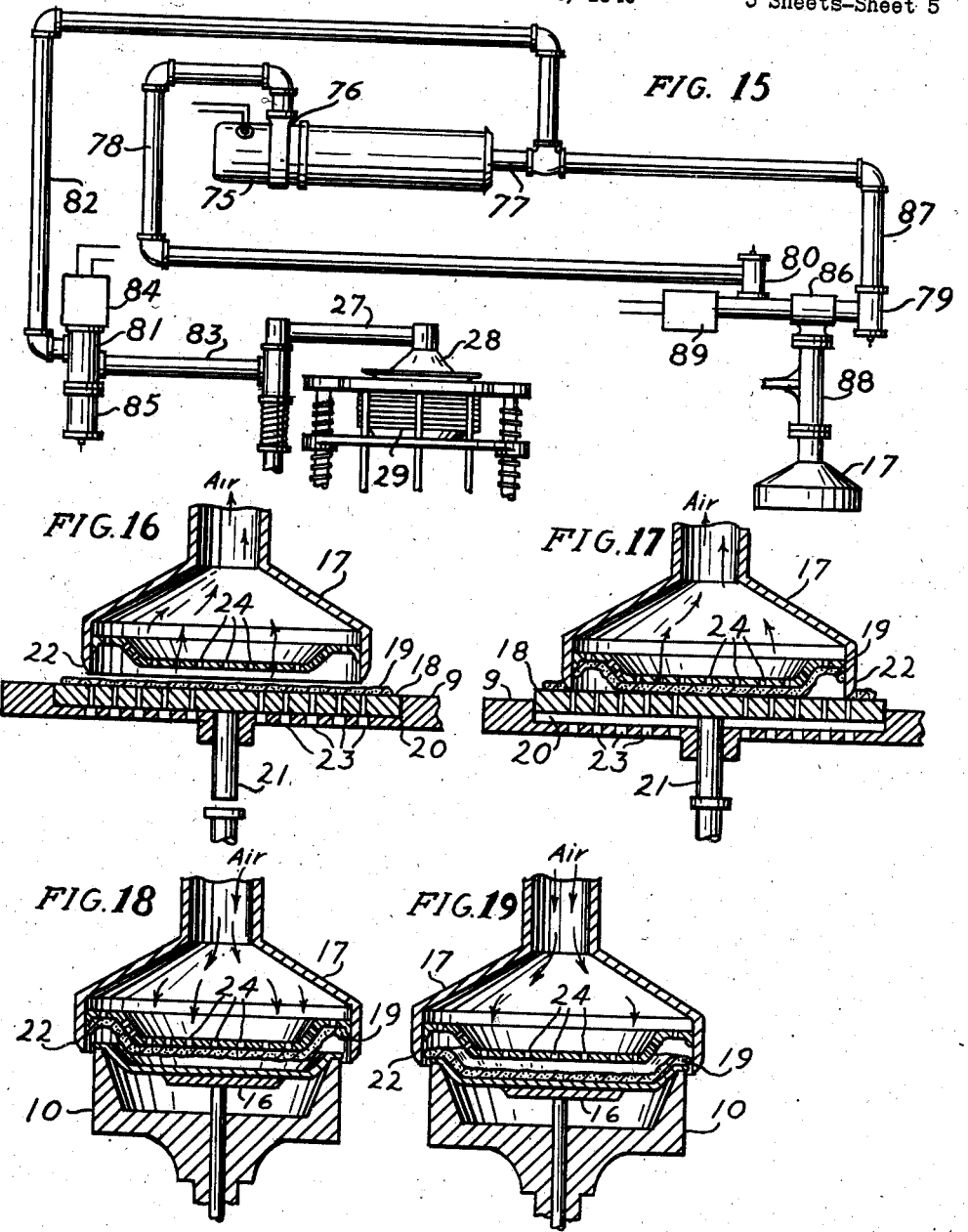

Patented Apr. 21, 1942

2,280,324

UNITED STATES PATENT OFFICE 2,280,324

PIE MAKING MACHINE

Oliver H. Tracy, Portland, Oreg.

Application October 14, 1940, Serial No. 361,017

12 Claims. (Cl. 107—1)

My invention relates particularly to pie making machinery and has for its particular object, the provision of a machine for forming the bottom crust of pies.

One of the principal objects of my invention is to provide a machine of this character which has a dough forming head which is adapted to pick up a blank of dough, form it to the shape of a bottom crust by pneumatic means and to blow the crust thus formed right side up into a pie pan or plate arranged thereunder. Thus said crust can be formed to correct size and to correct shape outside of the pie pan or plate and will not be crushed therein.

A further object of my invention is to provide selective means for picking up the crust to be formed, and a pipe plate, said means operating so that if there is no crust to be engaged or no pie plate in proper position, then the mechanism will be inoperative and no dough will be formed unless there is a pie plate or tin ready to receive it after it has been formed.

A further object of my invention is to provide a conveyor for blanks of dough, which conveyor is adapted to move said blanks of dough successively under the forming head, said conveyor being flat to receive said blanks of dough initially but perforated so that pneumatic means may easily pick up one of said blanks without having to overcome a substantial amount of adhesion of the dough to the conveyor or to overcome a partial vacuum formed under the blank of dough by reason of the contact of said dough with said conveyor.

A further object of my invention is to provide a feeding mechanism for a stack of pie plates or tins which feeding mechanism brings the uppermost plate into proper position so that it can be easily and positively engaged by selector mechanism to bring said plate into proximity with the dough forming head to receive a formed portion of dough which may be deposited in said pie plate or tin.

A further object of my invention is to provide a drive for conveyor mechanism adapted to deliver blanks of dough to the forming head, which drive has control elements provided to stop the conveyor when the blank of dough is in proper position and other control elements to start said conveyor after said dough has been removed from the conveyor and arranged in the forming head, said controls being automatic and arranged in parallel to perform this function.

A further object of my invention is to provide transfer means by which pie plates or tins may be easily received from a stack or supply, may be moved into position so as to receive a crust formed therein, may be lifted to proximity with the dough forming head so that proper registration may be had between the formed dough and the tin. Thereafter the tin with the dough formed therein may be easily engaged by conveying mechanism and moved on through said machine.

A further object of my invention is to provide a reciprocating carriage element having two operating members spaced apart a distance substantially equal to the length of the path of travel of said carriage so that successive operations can be performed by a single carriage as it reciprocates from one end of its path of travel to the other. That is, said carriage is adapted to bring a blank of dough from a point where it is formed to a point where it may be discharged into a pie plate or tin and simultaneously thereof, the preceding formed blank of dough arranged in a tin may be removed from said latter point to a conveyor to transport it further through said machine.

A further object of my invention is to provide a lower crust forming device which may be joined to a standard conveyor and be operatively connected thereto and synchronize therewith so that my bottom crust forming machine may function with any standard filling apparatus now commonly used with pie making machinery.

A further object of my invention is to provide simple mechanisms in a machine of this character so that dough for the bottom crust may be rapidly formed and placed in pie tins with minimum attention. I achieve said latter object by providing a machine that carries out in a predetermined sequence, a number of mechanical and pneumatic operations for forming the dough, filling the pie plates or tins and discharging said filled tins from said machine. The pneumatic devices are provided with more or less constant vacuum so as to limit the necessity for valves and other complicated control elements. The parts are arranged so that although the operation is continuous, lost motion devices are provided so as to provide ample time for the performing of the various operations and transfers from one part of the machine to the other.

Further and more specific objects of my invention and the details of the structure are hereinafter described with reference to the accompanying drawings in which:

Fig. 4 is a fragmentary sectional view taken along the line 4—4 in Fig. 3;

Fig. 5 is a fragmentary sectional view taken along the line 5—5 in Fig. 3;

Fig. 6 is a fragmentary sectional view taken along the line 6—6 in Fig. 3;

Fig. 7 is a fragmentary horizontal sectional view of a portion of the structure shown in Fig. 1;

Fig. 8 is a fragmentary horizontal sectional view of the structure shown in Fig. 1, a part of said structure being shown in a different operating position;

Fig. 9 is a fragmentary side elevation of the structure shown in Fig. 8;

Fig. 10 is an electric diagram, partially schematic, showing the connections to the electrical parts of the machine shown in Fig. 1;

Fig. 11 is an end elevation of the structure shown in Fig. 1;

Fig. 12 is an enlarged fragmentary perspective detail view of a portion of the structure shown in Fig. 11;

Fig. 13 is an enlarged fragmentary perspective detail view of another portion of the structure shown in Fig. 11;

Fig. 14 is an enlarged foreshortened detail view of still another portion of said structure;

Fig. 15 is a diagrammatic view showing the arrangement of the pneumatic conduits and parts connected thereto in the machine shown in Fig. 1;

Fig. 16 is a fragmentary sectional view taken in the direction of the arrow 16 in Fig. 1;

Fig. 17 is a view similar to Fig. 16, the parts being shown in a different operating position;

Fig. 18 is a fragmentary sectional view taken in the direction of the arrow 18 in Fig. 9; and Fig. 19 is a view similar to Fig. 18, the parts being shown in a different operating position.

Figure 1:
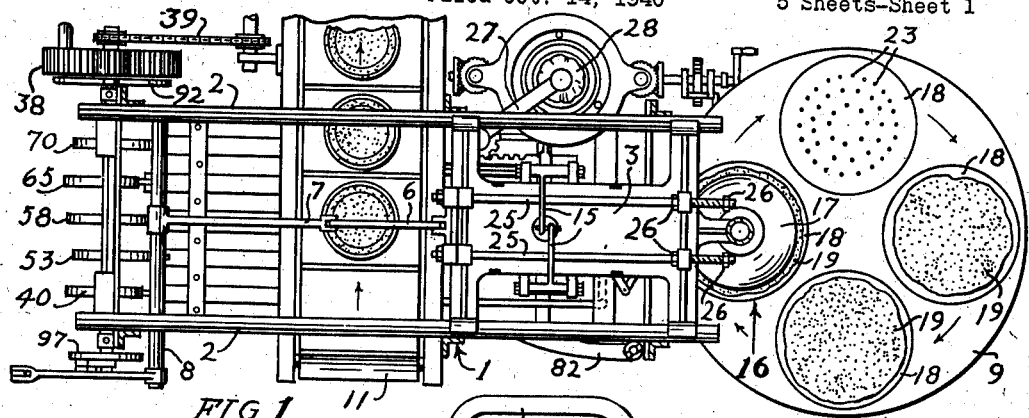
Fig. 1 is a plan view, partly in section taken along the line 1—1 in Fig. 2, of a machine embodying my invention.

A machine embodying my invention comprises a frame 1 (Fig. 2) the two upper members 2 of which define a way or track for carriage 3. Said carriage is caused to reciprocate on said way by crank 4, having a crank pin 4a, which crank actuates connecting rods 5 and 6 and bell crank 7 which is pivotally mounted on shaft 8. As carriage 3 reciprocates it simultaneously performs two functions. First, it carries dough from conveyor table 9 and deposits it in an empty tin on holder 10. Second, it carries a previously filled tin from holder 10 and deposits it on conveyor 11. It will be understood that a tin having dough for the bottom crust deposited therein is referred to as a filled tin, for convenience. The filling of the tin with the other ingredients of which the pie is to be made is carried out in a subsequent operation not concerned with the present invention.

A pair of tongs 12 are provided for grasping the filled tin and carrying it to conveyor 11. Said tongs are normally held in a closed position by spring 13 (Fig. 12). When carriage 3, on which tongs 12 are mounted, moves rearwardly to the position shown in Fig. 9, the filled tin is directly over conveyor 11 and it is then desired to release said tin, allowing it to drop to the conveyor. This result is accomplished by actuation of solenoid 14 which pulls downward on the horizontal members 15 of tongs 12, said tongs being in the form of a pair of bell cranks. Means for energizing said solenoid at the proper time will be described hereinafter. Suffice it to say here that solenoid 14 holds tongs 12 in their open position until carriage 3 has carried said tongs back to another filled tin, said tin at that time resting upon plunger 16 within holder 10.

For the purpose of carrying dough from table 9 to an empty tin on holder 10, a head 17 is provided. Said head comprises a mold having the proper shape, on its under side, to properly form a layer of dough to fit an empty tin. Said dough is initially placed on plates 18 in the form of thin discs 19 manually or by means not concerned with the present invention. Plates 18 seat in shallow recesses 20 (Fig. 16) in table 9, each being guided by a stem 21 affixed to said plate. Table 9 rotates until one of plates 18 and the dough thereon is directly under head 17 when the latter has been carried to its forward position by carriage 3 whereupon said plate is lifted, by means hereinafter described, until it makes contact with head 17 (Fig. 17). Two results are brought about by the lifting of said plate. First, the disc of dough 19, which was originally somewhat larger than necessary, is trimmed to the proper size by the pendent rim 22 of head 17, said dough being pinched between the sharpened edge of said rim and the surface of said plate 18.

Second, when the plate 18 is lifted the dough thereon forms a seal over the bottom of head 17 and vacuum applied to said head, by means hereinafter described, sucks the dough upward into said head where it assumes the shape of an empty tin. Of course, the force which actually moves the dough upward is the atmospheric pressure applied to the under side thereof thru holes 23 in plate 18, the atmospheric pressure on the upper surface of said dough being reduced by vacuum applied thru holes 24 in head 17.

It is necessary that head 17 remain stationary while plate 18 is being lifted to make contact therewith, and for a short time thereafter. But carriage 3 is reciprocated by a crank arm that rotates continuously and therefore produces continuous reciprocating motion. To permit head 17 to remain stationary for a short time at the ends of its stroke, rods 25 (Fig. 1) are driven directly by connecting rod 6 and therefore have continuous reciprocating motion whereas carriage 3 is driven from said rods by means of nuts 26 which may be spaced apart to allow the desired lost motion between rods 25 and carriage 3.

As mentioned, dough is placed in empty tins while the latter rest upon holder 10, said holder being of such size and shape that the tins are held accurately in a predetermined place immediately below head 17 when carriage 3 is at the end of its travel. Thereafter, while the carriage is moving forward and returning with more dough, it is necessary to place another empty tin upon holder 10. I achieve this result with what I call a crane comprising a hollow arm 27 (Fig. 1) carrying a suction member 28 at its outer end, said suction member preferably being made of rubber or some similar material.

Four operations are involved in the carrying of an empty tin from stack 29 to holder 10. First, as empty tins are removed from the stack, it is necessary to raise the stack to keep the top thereof at a constant height. Second, when the crane is in position to pick up a tin, suction member 28 must be lowered to contact the uppermost tin in stack 29. Third, when suction member 28 has been lowered and lifted with an empty tin, the crane must be rotated so that arm 27 carries the tin over holder 10. Then, the suction must be interrupted to release the tin. Means for carrying out these operations will be hereinafter described.

Having described generally the operation of my invention, I will now describe in detail the mechanisms for carrying out the various operations. I will first describe the means for rotating table 9. Motor 30 (Fig. 3), which may be of any well known type, is adapted to rotate said table thru reduction gears (not shown) and chain 31 engaging sprocket 32 affixed to shaft 33 which carries table 9 at its upper end. In the electric circuit (Fig. 10) for motor 30 limit switch 34 is connected, said limit switch being positioned properly to stop said table with one of plates 18 directly under head 17, when the latter is in its forward position, when engaged by stem 21 of another of said plates.

When table 9 has been stopped long enough for the dough to be removed from plate 18, it is desired that said table rotate to bring another of said plates under head 17. Inasmuch as limit switch 34 cannot readily be closed to start said rotation, it being held open by one of stems 21, another switch 35 is provided connected in parallel with switch 34 and adapted to be closed for a short time when plate 18 is lowered after having been raised to contact head 17 and deposit its dough therein. A contact arm 36 adapted to close switch 35 is carried by the means for lifting plate 18, hereinafter described.

Figure 2:
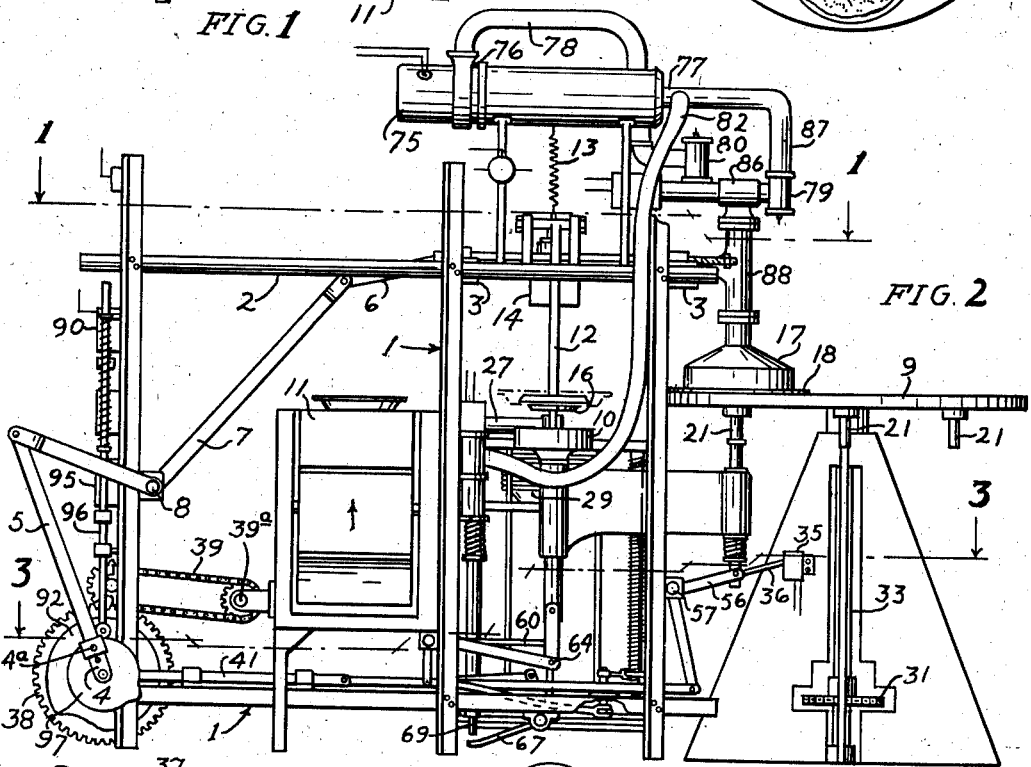
Fig. 2 is a side elevation of said machine.
Figure 3:
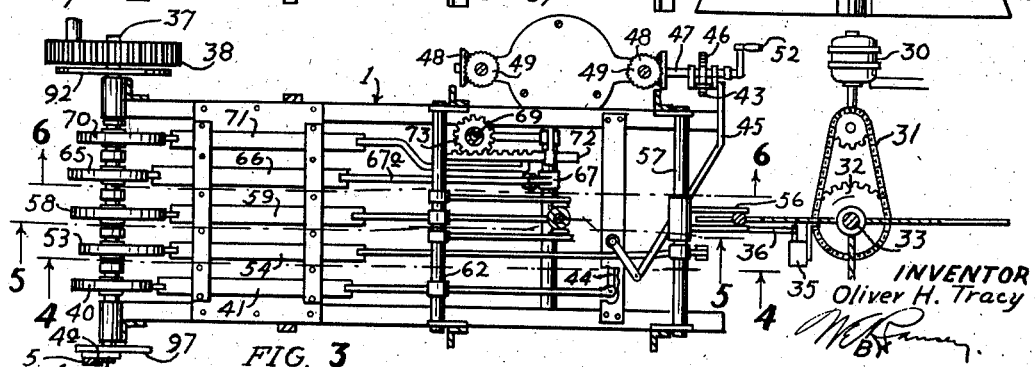
Fig. 3 is a horizontal section taken substantially along the line 3—3 in Fig. 2.

The operations performed by the remainder of the machine are controlled by cams on shaft 37 which is driven from shaft 39a of the conveyor chain 11 thru gear 38 and chain 39 (Fig. 2). Referring to Fig. 3, at the outer end of shaft 37 is the crank 4 which serves to reciprocate carriage 3, as hereinbefore described. Next, cam 40 pushes cam follower 41 (Fig. 13) against the tension of spring 42 to actuate ratchet 43 thru bell crank 44 and connecting rod 45. Ratchet wheel 46, actuated by ratchet 43, is affixed to shaft 47 (Fig. 14) which carries bevel gears 48 which mesh with bevel gears 49 affixed to vertical shafts 50. Said vertical shafts are threaded so that, when rotated, they raise or lower platform 51 which supports stack 29 of empty tins. Said parts are so arranged that cam 40 thru ratchet 43 raises platform 51 an amount equal to the thickness of one tin each revolution of shaft 37, that is, each time a tin is removed from stack 29. When said stack is to be replenished, platform 51 may be rapidly lowered by turning crank 52 on shaft 47.

The cam 53 adjacent cam 40 acting thru cam follower 54 (Fig. 4), against the tension of spring 55, and thru bell crank 56 pivotally mounted on shaft 57 serves to engage one of stems 21 to lift the corresponding plate 18 a distance sufficient to contact head 17. As bell crank 56 descends under the force of spring 55, arm 36 engages switch 35 to start motor 30, as hereinbefore described.

Cam 58 thru cam follower 59 (Fig. 5) and bell crank 60 and against the tension of spring 61 serves to lift plunger 16, and the filled tin thereon, an amount sufficient to place said tin within the grasp of tongs 12. Bell crank 60 is journalled on shaft 62.

Cam 40 performs a function in addition to that hereinbefore described in that it serves to rotate shaft 62 thru crank arm 63 affixed thereto, thru crank 64 raising holder 10 and the empty tin thereon to receive dough from head 17.

Cam 65 thru cam follower 66 (Fig. 6) and bell crank 67 connecting rod 67a and against the tension of spring 68 serves to lift shaft 69 and crane arm 27 thereon when an empty tin has been engaged by the suction cup on said arm.

Cam 70 thru cam follower 71 and rack 72 (Fig. 3) serves to rotate gear 73 affixed to shaft 69 against the torsion of spring 74 (Fig. 6) to swing crane arm 27 around to deposit an empty tin on holder 10 just before head 17 reaches said holder on its backward travel.

The pneumatic part of my invention, shown diagrammatically in Fig. 15, comprises a motor 75 directly connected to a blower 76 adapted to produce suction in pipe 77 and to discharge air under pressure thru pipe 78. Said motor and blower may be of any suitable type such, for example, as the motor and blower assembly of a vacuum cleaner. I contemplate that, during the operation of my machine, said motor and blower shall operate continually. The amount of suction produced may be controlled by relief valve 79 which may be adjusted to admit air when the suction exceeds a predetermined value. Likewise, the pressure of the discharged air may be controlled by relief valve 80 which may be adjusted to release air when said pressure exceeds a predetermined value.

When valve 81 connecting pipes 82 and 83 is open, said pipes serve to supply vacuum to suction cup 28. Then, when an empty tin is raised to contact said cup, it is held by the suction. When it is desired to release said tin, solenoid 84 may be energized to close valve 81 and at the same time open said latter valve to admit air at atmospheric pressure to pipe 83. Thus, the application of suction to move an empty tin involves only one operation, the energizing of solenoid 84, means for which will be hereinafter described.

When two-way valve 86 connecting pipes 87 and 88 is in one position, said pipes serve to supply vacuum to head 17 to lift and form a disc of dough when the latter is lifted into contact therewith. When said dough is to be deposited in an empty tin, solenoid 89 may be energized to move said valve to its other position wherein pipe 87 is closed and pipe 78 is connected to pipe 88 thereby applying air under pressure to head 17 and forcibly blowing the dough therein into the empty tin. Thus, the placing of the dough in the empty tin by pneumatic means requires only one operation, the energizing of solenoid 89, means for which will be hereinafter described.

An important feature of my invention involves the aforesaid application of vacuum to a disc of dough and to an empty tin. Except when said articles are to be released, suction will be applied to both suction cup 28 and head 17. Inasmuch as the disc of dough and the empty tin make contact with their respective lifting devices at about the same time, the intake side of blower 76 will be wholly closed and a substantial vacuum will be produced, sufficient to lift both the dough and the tin. However, if either the disc of dough or the empty tin are not in place, the intake of blower 76 will not be closed and no substantial vacuum will be produced. It follows that if no dough is supplied to table 9, no empty tin will be removed from stack 29. Conversely if no tin remains on said stack, no dough will be removed from said table. This is a desirable result, particularly as to the first mentioned result; if dough is not supplied to the machine, it is simply inoperative, whereas with a different arrangement the empty tins might be transported to conveyor 11 uselessly when no dough was supplied.

There remains to be described the means for actuating three solenoids, one of which releases empty tins, another of which deposits dough in an empty tin, and the third of which releases the filled tin, depositing it on the conveyor, and holds tongs 12 open until they are in position to grasp another filled tin.

Switch 90 (Figs. 10 and 11) actuated by cam follower 91 and cam 92 is adapted, when closed, to connect solenoid 89 to a suitable source of power, such as alternator 93, thereby to deposit dough in an empty tin. Switch 94, also actuated by said cam and cam follower is adapted, when closed, to connect solenoid 14 to said source of power to actuate members 15 and open tongs 12, thereby depositing a filled tin on the conveyor and holding said tongs open until they are in position to engage another tin. Switch 95 actuated by cam follower 96 and cam 97 is adapted, when closed, to connect solenoid 84 to power thereby to deposit an empty tin on holder 10.

Thus, the machine hereinbefore described transports simultaneously dough from table 9 and an empty tin on stack 29 to holder 10 and a filled tin from holder 10 to conveyor 11. It does this by means of a carriage having two elements spaced apart a distance equal to the travel of the carriage, said two elements being head 17 and tongs 12.

It will be understood that, as used herein, the word "tin" means a pie tin or the like which may be made of any suitable material.

I claim:

1. An apparatus for forming a pie crust from a blank of dough and placing it in a pan, comprising means defining a station, a forming head adapted to move periodically into close proximity to said station, means for producing a sub-atmospheric pressure in the forming head for moving a blank from said station into said head and forming it to desired shape, and means for producing a super-atmospheric pressure in the forming head for removing it from said forming head into a pie pan having said desired shape.

2. An apparatus for forming a pie crust from a blank of dough and placing it in a pan, comprising means defining a station, a forming head adapted to move periodically into close proximity to said station, means for producing a sub-atmospheric pressure in the forming head for moving a blank from said station into said head and forming it to desired shape, and means for producing a super-atmospheric pressure in the forming head for blowing it out of said forming head into a pie pan having said desired shape.

3. An apparatus for forming a pie crust from a blank of dough and placing it in a pan, comprising a rotary conveyor element defining a plurality of receptacles for receiving blanks of dough and moving them successively to a predetermined station, a forming head adapted to move periodically into close proximity to said station, means for producing a sub-atmospheric pressure in the forming head for lifting a blank from said station into said head and forming it to desired shape, and means for producing a super-atmospheric pressure in the forming head for removing it from said forming head into a pie pan having said desired shape, each of said conveyor receptacles having a perforated surface formed thereon arranged to hold a blank of dough and defining said station.

4. An apparatus for forming a pie crust from a blank of dough and placing it in a pan, comprising means defining a station, a forming head adapted to move periodically into close proximity to said station, means for producing a sub-atmospheric pressure in the forming head for lifting a blank from said station into said head and forming it to desired shape, and means for producing a super-atmospheric pressure in the forming head for blowing it out of said forming head into a pie pan having said desired shape, said forming head being provided with a perforated wall section defining its specific forming element.

5. An apparatus of the character described, comprising a frame, a carriage mounted for reciprocal action thereon over a path of travel of predetermined length, a dough forming head carried by said carriage, and a pie pan engaging device also carried by said carriage, said head and said device being spaced apart a distance substantially equal to the length of travel of said carriage, the discharging terminus of the path of travel of said head coinciding with the receiving terminus of said device.

6. An apparatus of the character described, comprising a frame, a carriage mounted for reciprocal action thereon over a path of travel of predetermined length, a dough forming head carried by said carriage, a pie pan engaging device also carried by said carriage, said head and said device being spaced apart a distance substantially equal to the length of travel of said carriage, the discharging terminus of the path of travel of said head coinciding with the receiving terminus of said device, and means for placing pie pans at said common terminus to receive and hold dough from said head and to carry said dough when said pans are engaged by said device.

7. An apparatus of the character described, comprising a frame, a carriage mounted for reciprocal action thereon over a path of travel of predetermined length, a dough forming head carried by said carriage, a pie pan engaging device also carried by said carriage, said head and said device being spaced apart a distance substantially equal to the length of travel of said carriage, the discharging terminus of the path of travel of said head coinciding with the receiving terminus of said device, and power means for reciprocating said carriage, said means having lost motion devices so as to permit said carriage to pause at said terminus for a substantial period of time during the operating cycle of said power means.

8. In an apparatus for forming pie crusts and placing them in pie pans, pneumatic means including a forming head and devices for producing a sub-atmospheric pressure in the forming head for picking up blanks of pie dough, pneumatic means for picking up pie pans, and a common source of power for operating said two pneumatic means, said sources of power being of insufficient capacity to engage and move either said blank of pie dough or said pans unless said two pneumatic means simultaneously pick up objects.

9. A forming mold for pie crust comprising a base section and a head section, said two sections being operatively arranged to move into and out of proximity one with the other, said head section having a perforated wall defining a vacuum chamber on one side and a dough forming surface on the other, said base section being perforated to permit air to pass therethrough to permit a blank of dough to be forced upwardly by reason of the reduced pressure above said forming surface.

10. A forming mold for forming a pie crust from a blank of dough comprising a base section and a head section, said two sections being operatively arranged to move into and out of proximity one with the other, and means for moving said parts into and out of proximity with each other, said forming head having a sharp edged periphery formed thereon which is adapted to engage the base member and to trim a blank of dough to proper shape after said blank has been formed.

11. In an apparatus for forming pie crusts and placing them in pans, a conveyor element defining a plurality of receptacles for retaining blanks of dough and for moving them successively to a predetermined point, a forming head adapted to move periodically into close proximity to said point, a motor for moving said conveyor, an electric power circuit for said motor, and make-and-break elements arranged in said power circuit in parallel with each other, one of said make-and-break elements having operating parts engageable periodically with portions of said conveyor to break said circuit when one of said receptacles is arranged at said point, the other make-and-break elements having an operating element actuated after said head has moved into close proximity to said point, whereby said motor circuit is broken when one of said receptacles moves to said point and said circuit is made again after said forming head has moved to said point.

12. In an apparatus for forming pie crusts and placing them in pans, a conveyor element defining a plurality of receptacles for retaining blanks of dough and for moving them successively to a predetermined point, a forming head adapted to move periodically into close proximity to said point, a motor for moving said conveyor, an electric power circuit for said motor, make-and-break elements arranged in said power circuit in parallel with each other, one of said make-and-break elements having operating parts engageable periodically with portions of said conveyor to break said circuit when one of said receptacles is arranged at said point, and a member operatively connected to said head and movable in a predetermined relation thereto, said member being adapted and arranged to close another of said make-and-break elements for only sufficient time to cause said motor to move said conveyor out of engagement with said first mentioned make-and-break element, whereby said motor circuit is broken when one of said receptacles moves to said point and said circuit is made again after said forming head has moved to said point.

OLIVER H. TRACY.